United States Patent
Bozich

[15] 3,678,700
[45] July 25, 1972

[54] COMPRESSOR CLUTCH WITH TIME DELAY CONTROL

[72] Inventor: Robert A. Bozich, 356 Winchester St., Newton Highlands, Mass. 02161

[22] Filed: Feb. 16, 1971

[21] Appl. No.: 115,415

Related U.S. Application Data

[63] Continuation-in-part of Ser. No. 868,473, Oct. 22, 1969, abandoned.

[52] U.S. Cl. ..........................62/323, 192/.034, 192/109 R, 335/239
[51] Int. Cl. .......................................................F25b 27/00
[58] Field of Search ...................192/.034, .07, .075; 62/323, 62/158; 192/109 R, 109 D, 84 R

[56] References Cited

UNITED STATES PATENTS

| | | |
|---|---|---|
| 3,462,964 | 8/1969 | Haroldson..............................62/323 X |
| 2,880,595 | 4/1959 | McGuffey et al. ...................62/158 X |
| 3,101,432 | 8/1963 | Adams...................................62/158 X |
| 3,127,754 | 4/1964 | Mobarry................................62/158 |
| 3,422,633 | 1/1969 | Bodett....................................62/158 |
| 3,459,006 | 8/1969 | Hoyer....................................62/323 X |

*Primary Examiner*—Benjamin W. Wyche
*Attorney*—Kenway, Jenney & Hildreth

[57] ABSTRACT

Apparatus is disclosed which automatically disengages a secondary load on an automobile engine, e.g. an air-conditioner compressor, during periods of full throttle operation by deenergizing an electromagnetic clutch in response to a drop in intake manifold vacuum below a predetermined level. Switching hysteresis and a delay upon re-energization are employed to prevent rapidly repeated operation.

2 Claims, 1 Drawing Figure

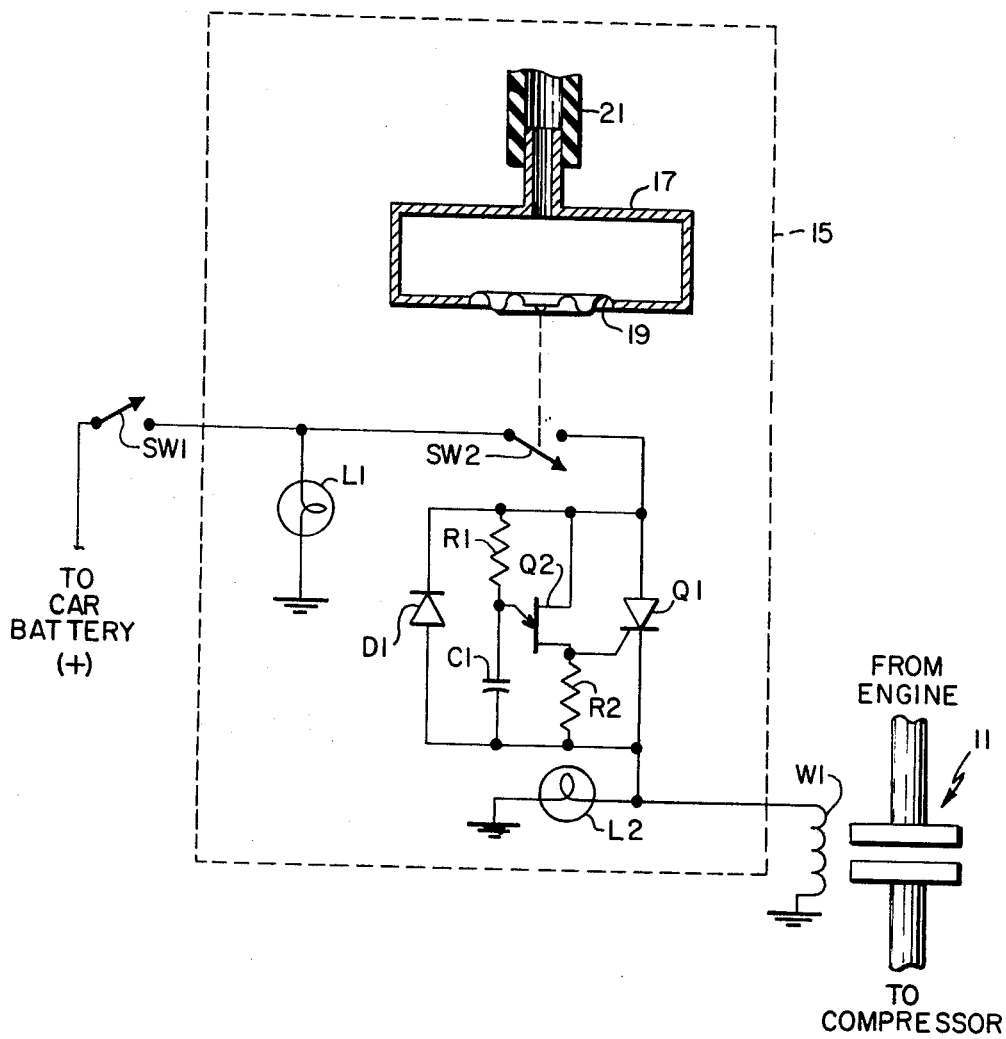

COMPRESSOR CLUTCH WITH TIME DELAY CONTROL

This application is a continuation-in-part of my copending application, Ser. No. 868,473 filed Oct. 22, 1969, and now abandoned.

BACKGROUND OF THE INVENTION

While most automobile engines are capable of driving a variety of accessories while maintaining normal power output for propelling the vehicle, at a steady normal speed, the power drain imposed by such accessories may be objectionable in certain situations when maximum power is needed for acceleration. Accessory loading can be particularly a problem in the situation where air-conditioning is installed in a small, four cylinder car. In such cars, the load presented by the air-conditioner compressor may constitute a substantial proportion of the power available from the engine, particularly if the engine speed is substantially below its maximum power range. In such a situation, full throttle operation will not produce maximum horse power and thus acceleration, e.g., for passing, will be substantially hampered by the load imposed by the air-conditioner compressor.

Among the several objects of the present invention may be noted the provision of apparatus for automatically cutting out a secondary load, such as an air-conditioner compressor, during full throttle operation; the provision of such apparatus which provides stable and predictable operation; the provision of such apparatus which is reliable and which is relatively simple and inexpensive. Other objects and features will be in part apparent and in part pointed out hereinafter.

SUMMARY OF THE INVENTION

Briefly, apparatus according to the present invention is operative, during full throttle operation, to reduce the load placed on an automotive engine by secondary accessories which are driven by the engine through an electrically operable clutch. A switch is operated by a means which responds to relative pressure and which is connected to the intake manifold of the engine. Circuit means are provided for interconnecting the switch and the accessory operating clutch for disengaging the clutch when the manifold vacuum drops below a predetermined level. Accordingly, the secondary load is reduced on the engine during full throttle operation. Re-engagement of the clutch is delayed to prevent rapidly repeated operation and to permit pressures to equalize in the case of an air-conditioner compressor being driven by the clutch.

BRIEF DESCRIPTION OF THE DRAWING

The single FIGURE is a schematic circuit diagram of secondary load cutout apparatus according to the present invention.

DESCRIPTION OF THE PREFERRED EMBODIMENT

Referring now to the drawing, the apparatus illustrated there is operative to automatically de-energize the clutch of an automotive air-conditioner compressor during full throttle operation of the automobile in which the air-conditioner is installed. A conventional electromagnetic clutch for operating the compressor from the automobile engine is indicated generally at 11. Clutch 11 includes a winding W1 which, when energized, engages the clutch to drive the compressor.

One side of winding W1 is grounded in conventional manner. Conventional air-conditioning control switching is represented by a single switch SW1. In the air-conditioning systems commonly applied to small, four cylinder cars, temperature control is typically achieved by controlling the duty cycle of the compressor. Thus the control circuit through which the clutch is conventionally energized may include both a manual switch and also a thermostatically operated switch which energizes and de-energizes the clutch 11 to maintain the temperature inside the vehicle within preselected limits.

In the drawing, apparatus according to the present invention is indicated generally at 15 and is interposed in the clutch control circuit between the winding W1 and the conventional control switching indicated at SW1. The clutch winding W1 is energized through a circuit which includes a switch SW2 and an SCR (silicon controlled rectifier) Q1. An indicator lamp L1 is arranged to light when power is available from the air-conditioner control circuit, i.e., to indicate demand, and a second lamp L2 is connected to indicate when the compressor clutch is actually energized. Switch SW2 is controlled by a vacuum actuator 17 having a diaphragm 19 which responds to relative pressure. One side of the diaphragm 19 is exposed to atmospheric pressure while the other side is connected, through flexible tubing 21, to the intake manifold of the automobile engine. The actuator 17 and switch SW2 are arranged so that the switch is normally open, e.g., when the engine is stopped, and is closed when the manifold vacuum exceeds a predetermined value. The switch SW2 is preferably of a snap acting type exhibiting a substantial mechanical hysteresis so that there is a predetermined differential in pressure between the point of actuation for opening and for closing. In one successful embodiment of the invention, the vacuum operated switch was arranged to open at nine inches of mercury and to close at eight inches of mercury (relative pressure). The differential between the pressures of switch opening and closing may also be produced by hysteresis in the diaphragm itself, e.g., by using a domed diaphragm providing a snap action.

Delayed triggering of SCR Q1 is provided by means of an electronic delay circuit comprising a unijunction transistor Q2, a timing capacitor C1 and a resistor R1 through which the capacitor C1 is charged. Unijunction transistor Q2 is also provided with a load resistor R2. As is understood by those skilled in the art, when the voltage on capacitor C1 reaches a threshold determined by the intrinsic stand-off ratio of transistor Q2, the transistor abruptly switches into a conductive state in which capacitor C1 discharges through resistor R2. The voltage pulse thereby generated across resistor R2 is applied across the gate-cathode junction of SCR Q2 so as to trigger that semiconductor switching device into conduction. A diode D1 protects the electronic circuitry from inductively generated pulses when the winding W1 is de-energized.

The operation of the automatic cutout apparatus is substantially as follows. During normal operation, e.g., when cruising at a steady speed, the switch SW2 is held closed by the substantial manifold vacuum operating on the actuator 17. Thus, the air-conditioning compressor may be operated in conventional manner on demand by the conventional control circuit switching SW1. If, however, the engine is operated under full throttle, e.g., when overtaking another car, the drop in manifold vacuum allows the switch SW2 to open. The compressor clutch winding W1 will thus be immediately de-energized, even though the switch SW1 is closed. Accordingly, full power will be available for accelerating the car so that an increased margin of safety is provided.

When the period of full throttle operation has passed, the resultant increase in manifold vacuum will again close the switch SW2. Since the SCR Q1 is initially non-conducting, the clutch winding W1 will not be immediately re-energized. Rather, the battery voltage will appear across the SCR Q1. The presence of this voltage will cause capacitor C1 to charge through resistor R1. After a delay determined by the relative values of capacitor C1 and resistor R1 and by the intrinsic stand-off ratio of transistor Q2, that transistor will fire and thereby trigger SCR Q1 into conduction. Conduction through SCR Q1 then shunts the timing circuit and energizes the clutch winding W1. It can thus be seen that delayed energization of the winding is obtained. A delay of about 5 seconds or slightly longer has been found appropriate for the purposes of the present invention and component values and type designations providing such a delay are indicated in the following table.

Q1 2N 4441
Q2 2N 491
D1 1N 4001
R1 220,000 ohms
R2 91 ohms

C1 20 microfarads

While an electro-mechanical relay can also be used to provide the desired delay upon re-energization, electronic delay in the manner illustrated is greatly preferred in that substantial delays of the order required are easily and flexibly obtained and adjusted. The hysteresis or differential between the pressures at which opening and closing of switch SW3 occur prevents unstable or rapidly repeated operation should the engine throttle be open to a point producing a manifold vacuum right around the operating threshold. Likewise, the delay provided by the electronic delay circuit also aids in preventing instability or rapidly repeated operation since, if the switch SW2 is re-opened within the delay period, the compressor clutch is not energized at all.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for reducing, during full throttle operation, the load placed on an automotive engine by an air-conditioner compressor which is driven by said engine through an electrically operable clutch having an operating winding which engages the clutch when energized, said apparatus comprising:

a switch;

a vacuum actuator responsive to relative pressure for operating said switch, said switch being opened when the manifold vacuum drops below a predetermined level;

conduit means for connecting said vacuum actuator to the intake manifold of said engine; and an electronic delay circuit including an SCR in series with said winding and said switch and a unijunction transistor timing circuit for triggering said SCR into conduction a predetermined interval after said switch closes and applies a voltage across said SCR for de-energizing said winding when said switch opens thereby to reduce the secondary load on said engine during full throttle operation and for re-energizing said winding only after a predetermined delay following closing of said switch.

2. Apparatus for reducing, during full throttle operation, the load placed on an automotive engine by an air conditioner which is driven by said engine through an electrically operable clutch having an operating winding which engages the clutch when energized, said apparatus comprising:

a snap-acting switch;

means responsive to relative pressure for operating said switching means;

conduit means for connecting said pressure responsive means to the intake manifold of said engine, the mechanical hysteresis inherent in the snap-acting switch causing the switch to open at a first value of manifold pressure and to close at a second, significantly different, value of manifold pressure;

a triggerable semi-conductor current switching device of the type which, when triggered, latches into a conductive state;

means for connecting said switch, said clutch winding and said semi-conductor switching device in series for connection to a d.c. power source; and electronic circuit means for triggering said semiconductor switching device into conduction after a predetermined delay following the application of the d.c. source voltage across said device, whereby said clutch is disengaged when the manifold vacuum drops below said first value thereby to reduce the secondary load on said engine during full throttle operation and is re-energized only after a predetermined delay following a subsequent increase in manifold vacuum above said second value.

* * * * *